United States Patent
Liu et al.

(10) Patent No.: US 11,941,844 B2
(45) Date of Patent: Mar. 26, 2024

(54) OBJECT DETECTION MODEL GENERATION METHOD AND ELECTRONIC DEVICE AND COMPUTER READABLE STORAGE MEDIUM USING THE SAME

(71) Applicant: UBTECH ROBOTICS CORP LTD, Shenzhen (CN)

(72) Inventors: Yepeng Liu, Shenzhen (CN); Yusheng Zeng, Shenzhen (CN); Jun Cheng, Shenzhen (CN); Jing Gu, Shenzhen (CN); Yue Wang, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 401 days.

(21) Appl. No.: 17/403,902

(22) Filed: Aug. 17, 2021

(65) Prior Publication Data

US 2022/0044438 A1 Feb. 10, 2022

Related U.S. Application Data

(63) Continuation of application No. PCT/CN2020/140412, filed on Dec. 28, 2020.

(30) Foreign Application Priority Data

Aug. 5, 2020 (CN) .......................... 202010778791.6

(51) Int. Cl.
*G06T 7/73* (2017.01)
*G06N 3/04* (2023.01)
*G06V 40/16* (2022.01)

(52) U.S. Cl.
CPC ................. *G06T 7/74* (2017.01); *G06N 3/04* (2013.01); *G06T 7/75* (2017.01); *G06V 40/164* (2022.01);

(Continued)

(58) Field of Classification Search
CPC ... G06T 7/74; G06T 7/75; G06T 2207/20081; G06T 2207/20084; G06T 2207/30201; G06V 40/164; G06N 3/04
See application file for complete search history.

(56) References Cited

U.S. PATENT DOCUMENTS

2018/0114337 A1* 4/2018 Li .................... G06V 10/764
2018/0300880 A1* 10/2018 Fan .................. G06V 20/582
(Continued)

FOREIGN PATENT DOCUMENTS

CN 106529424 A 3/2017

OTHER PUBLICATIONS

ISR for PCT/CN2020/140412.
Written opinions of ISA for PCT/CN2020/140412.

*Primary Examiner* — Utpal D Shah (57) ABSTRACT

An object detection model generation method as well as an electronic device and a computer readable storage medium using the same are provided. The method includes: during the iterative training of the to-be-trained object detection model, the detection accuracy of the iteration nodes of the object detection model is sequentially determined according to the node order, and the mis-detected negative samples of the object detection model at the iteration nodes with the detection accuracy less than or equal to a preset threshold are enhanced. Then the object detection model is trained at the iteration node based on the enhanced negative samples and a first amount of preset training samples. After the training at the iteration nodes are completed, it returns to the step of sequentially determining the detection accuracy of the iteration nodes of the object detection model until the training of the object detection model is completed.

20 Claims, 7 Drawing Sheets

(52) U.S. Cl.
CPC ............... *G06T 2207/20081* (2013.01); *G06T 2207/20084* (2013.01); *G06T 2207/30201* (2013.01)

(56) References Cited

U.S. PATENT DOCUMENTS

| | | | |
|---|---|---|---|
| 2021/0133518 A1* | 5/2021 | Yao | G06F 18/24317 |
| 2021/0398605 A1* | 12/2021 | Gao | G06N 3/045 |
| 2022/0058804 A1* | 2/2022 | Carmi | G06T 7/0016 |
| 2022/0092366 A1* | 3/2022 | Chiu | G06N 20/00 |
| 2023/0022554 A1* | 1/2023 | Peterson | A61B 5/6898 |
| 2023/0085605 A1* | 3/2023 | Zhang | G06T 3/40 |
| | | | 345/589 |

* cited by examiner

OBJECT DETECTION MODEL GENERATION METHOD AND ELECTRONIC DEVICE AND COMPUTER READABLE STORAGE MEDIUM USING THE SAME

CROSS REFERENCE TO RELATED APPLICATIONS

The present disclosure is a continuation-application of International Application PCT/CN2020/140412, with an international filing date of Dec. 28, 2020, which claims foreign priority of Chinese Patent Application No. 202010778791.6, filed on Aug. 5, 2020 in the State Intellectual Property Office of China, the contents of all of which are hereby incorporated by reference.

BACKGROUND

1. Technical Field

The present disclosure relates to object detection technology, and particularly to an object detection model generation method as well as an electronic device and a computer readable storage medium using the same.

2. Description of Related Art

Currently, in order to guarantee the accuracy of object detection, object detection models can be used to obtain the detection result which includes the targets contained in the captured image or video frame. For the existing training method, when training an object detection model, the positions with a labeled box are regarded as positive samples, and random sealing and random matting are performed according to the position and size of the labeled box. At the same time, the positive samples can also be obtained by other data expansion methods such as random transformation, thereby realizing the training of the object detection model. However, this existing training method usually does not consider the influence of the negative samples on lire detection accuracy of the object detection model. The other regions in the image that are not belong to the positive samples are generally referred to as the negative samples. During the training of the object detection model, if the influence of the negative samples is not taken into account, there will be many false detections that cannot be eliminated.

BRIEF DESCRIPTION OF THE DRAWINGS

To describe the technical schemes in the embodiments of the present disclosure or in the prior art more clearly, the following briefly introduces the drawings required for describing the embodiments. It should be understood that, the drawings in the following description merely show some embodiments. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It should be noted that, in the descriptions of the specification and the claims of present disclosure, the terms "first", "second", "third", and the like are only for distinguishing, and cannot be comprehend as indicating or implying relative importance.

It should be further noted that, the reference to "one embodiment" described in the specification of present disclosure means that one or more embodiments of present disclosure include the specific features, structures, or characteristics described in conjunction with that in the referenced embodiment. Therefore, the sentences "in one embodiment", "in some embodiments", "in other embodiments", and the like appearing in different places in the specification do not necessarily all refer to the same embodiment, but rather "one or more but not all embodiments" unless it is specifically emphasized otherwise. The terms "including", "comprising", "having" and their variations alt mean "including but not limited to", unless otherwise specifically emphasized.

Before describing an object detection model generation method provided in the present disclosure, the principle of generating an object detection model used in present disclosure is first exemplified in conjunction with that of the existing object detection model and its existing problems.

It can be understood that, the generation process of the object detection model includes the training stage of the model. Generally, the training stage of a model refers to the process of inputting a large number of training samples into a predetermined deep learning network for learning. In the embodiments of the present disclosure, the predetermined deep learning network includes, but is not limited to, common convolutional neural network model, deep trust network model, or stacked auto-encoding network models.

Figure 1A:
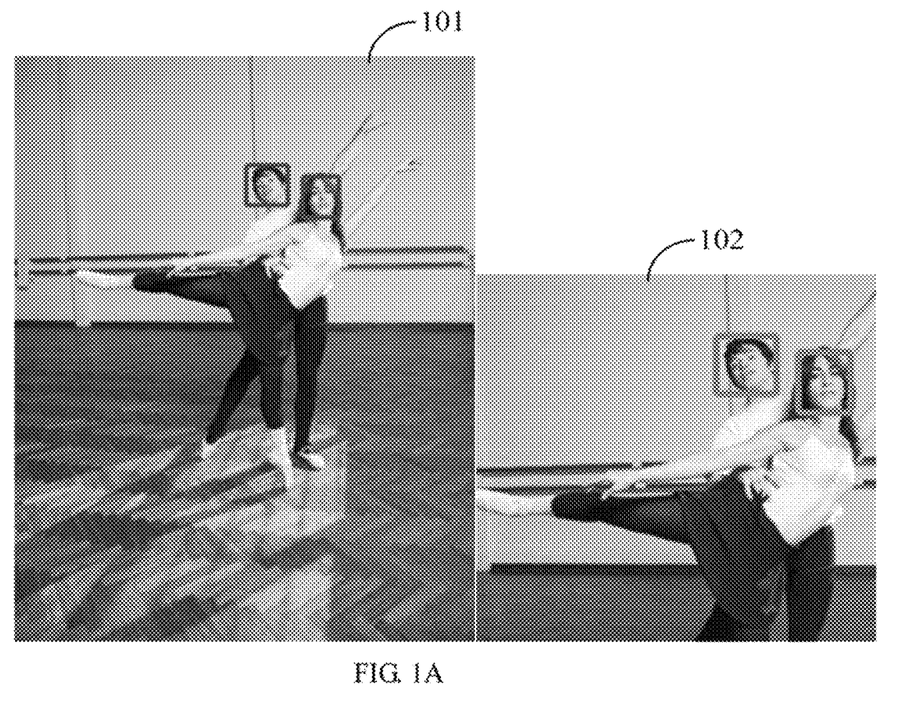
FIG. 1A is a schematic diagram of performing random face cropping on a training sample containing human faces according to an embodiment of the present disclosure.
Figure 1B:
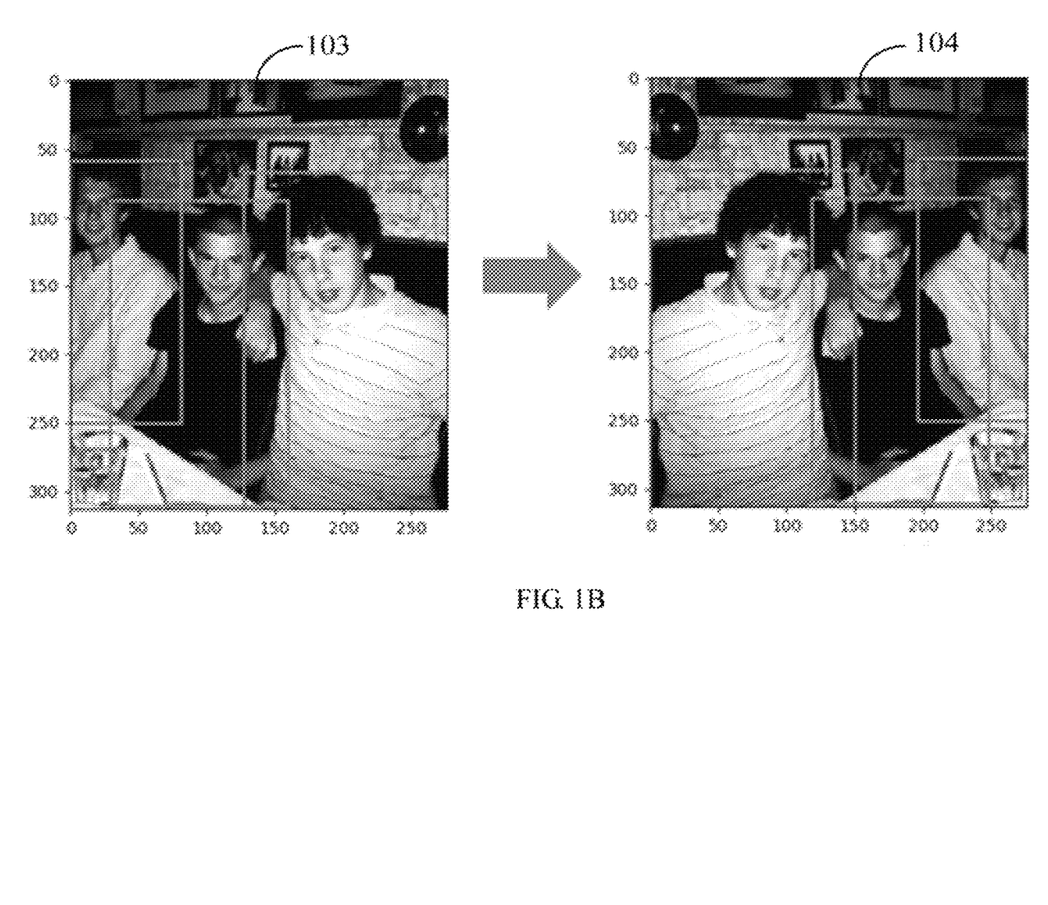
FIG. 1B is a schematic diagram of performing random mirroring on a training sample containing human faces according to an embodiment of the present disclosure.

The existing object detection model needs to preprocess training samples before performing model training. The common preprocessing includes: performing spatial transformation on the training samples in a training sample set. For example, the performing spatial transformation on the training samples includes performing random cropping and random mirroring of objects on the training samples. FIG. 1A is a schematic diagram of performing random face cropping on a training sample containing human faces according to an embodiment of the present disclosure; and FIG. 1B is a schematic diagram of performing random mirroring on a training sample containing human faces according to an embodiment of the present disclosure. As shown in FIG. 1A, after the training sample 101 containing human faces is cropped, the training sample 102 that has a different scale can be obtained. As shown in FIG. 1B, after the training sample 103 containing human faces is randomly mirrored, the training sample 104 showing an image of different space can be obtained. That is, by performing spatial transformations on the training images, the diversity of the training samples in scale and space can be increased.

After performing spatial transformation on the training sample, it further needs to adjust the contrast of the training sample. As an example, the adjustment of the contrast of the training sample includes multiplying each pixel in n image taken as the training sample by a random value within a preset range, so that the color difference of the training sample can be changed after the adjustment of the contrast of the training sample.

For the existing object detection model, before performing model training and after performing the above-mentioned preprocessing on the training samples, all the pre-processed training samples are input into the to-be-trained object detection model for model training. Because during randomly cropping the images of the training sample, random cropping is performed around the object, the cropped images will be images centered on the object. On the one hand, the scale of the target can be guaranteed to be not deformed, and the size of the object can be changed by scaling the cropped image while the object will not be deformed. On the other hand, the ratio of the size of the object in the image will be changed after the above-mentioned cropping, which actually increases the diversity of the scale of the object in the training samples.

However, the above-mentioned cropping process will result in the loss of a part of the background information in the training samples while the lost part of the background information in the training samples may usually contain important object data. For example, the hand or hindbrain of the human in the above-mentioned images (see FIG. 3B). During a face detection, the information of the hand or hindbrain of the human often affects the accuracy of the face detection. Usually, the parts around the object in the training sample is called negative samples. If a part of the negative samples are lost during training, the detection accuracy of the object detection model will be affected. For example, during the training of the face detection model, the influence of the negative samples such as the hand or the hindbrain may cause the increasement the rate of the false detection of the trained face detection model.

In view of this, the embodiments of the present disclosure provide an object detection model generation method. During the iterative training of the to-be-trained object detection model, the corresponding detection accuracy of the object detection model at each iteration node that has not finished training is sequentially determined according to the order of the nodes. In addition, for any object iteration node whose detection accuracy is less than or equal to a preset accuracy threshold, the mis-detected negative sample of the object detection model at the object iteration node is enhanced. After the enhanced negative sample is obtained, the object detection model is trained at the object iteration node based on the enhanced negative sample and the preset first amount of the training samples, which can effectively improve the false detection of the object detection model due to the influence of the negative samples.

Furthermore, it should be noted that, at present, the object detection model obtained through the object detection model generation method is lightweight and can be applicated widely. For example, the lightweight object detection model may be deployed on a mobile terminal of a robot to perform offline object detection. The object detection model may be a face detection model which performs face detection by being deployed on the mobile terminal of the robot. In which, the mobile terminal of the robot includes, but is not limited to, an ARM chip, an x86 development board, or the like. It should be noted that, since mobile terminals usually do not have many computing resources, when deploying the object detection model on the mobile terminal, there is usually a strict limit on the calculation amount of the object detection model.

Since the accuracy of a deep learning network is related to the depth of a network, as the depth of the network becomes shallower, the accuracy of the deep learning network will decrease accordingly. However, in practical applications, the mobile terminal has strict requirements for the accuracy of object detection. For example, when the mobile terminal on the robot detects human faces, if a non-human face is detected as a human face, the effect of the subsequent services of the robot will be seriously affected. If this object detection model is used for object detection on the mobile terminal, the accuracy of object detection will be greatly improved.

The object detection model generation method provided in the present disclosure will be described through the following embodiment.

Figure 2:
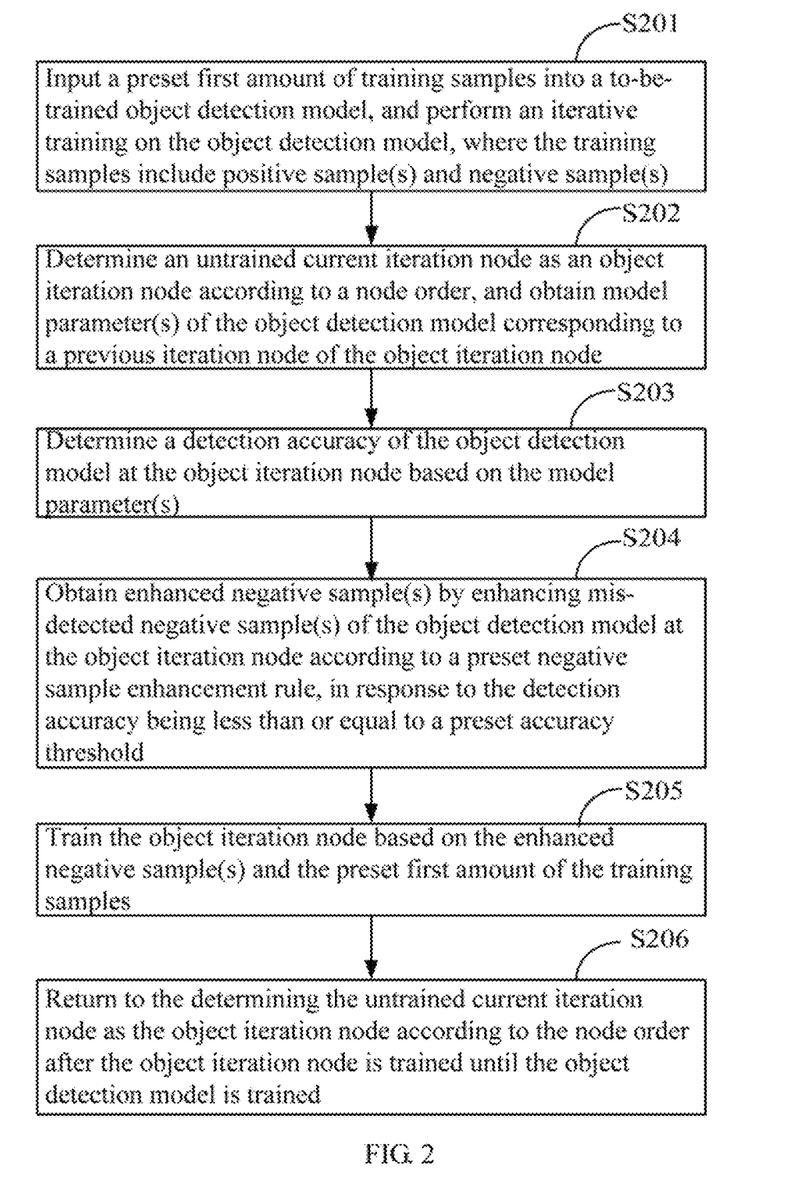
FIG. 2 is a flow chart of an object detection model generation method according to an embodiment of the present disclosure.

FIG. 2 is a flow chart of an object detection model generation method according to an embodiment of the present disclosure. The object detection model generation method may be implemented through an object detection model generation apparatus shown in FIG. 4 or an electronic device shown in FIG. 5 which may include but not limited to a server, a server cluster, a computer, and the like. As shown in FIG. 2, the method may include the following steps.

S201: inputting a preset first amount of training samples into a to-be-trained object detection model, and performing an iterative training on the object detection model, where the training samples include positive sample(s) and negative sample(s).

In this embodiment, the to-be-trained object detection model may include, but is not limited to, a face detection model, an animal detection model, a vehicle detection model, or the like. The structure of the object detection model may be a preset deep learning network such as convolutional neural network, deep trust network, or stacked self-encoding network. The positive sample is a target area marked in the training image, and the negative sample is the area around the positive sample in the training image.

S202: determining an untrained current iteration node as an object iteration node according to a node order, and obtaining model parameter(s) of the object detection model corresponding to a previous iteration node of the object iteration node.

It should be noted that, when performing iteratively training on the object detection mode, the batched training samples are trained through the deep learning network, the weight of the deep learning network will be updated once for each iteration, and the next iteration will be performed on the basis of the weight alter the previous iteration is completed. In which, the "batched" refers to the number of samples required for one iteration, which is usually set to the n power of 2. The commonly adopted value of "n" includes 64, 128, and 256. When the network is small, the value of 256 can be adopted, and that of 64 can be adopted when it is large.

In this embodiment, for each iteration node that has not completed training (each iteration node corresponds to a number of iterations), the model parameters) corresponding to the previous iteration node of each iteration node is determined in sequence according to the iteration order, and the model parameters) are the weight of the depth learning network.

S203: determining a detection accuracy of the object detection model at the object iteration node based on the model parameters).

As an example, the current iteration node that has not completed training is determined as the object iteration node, and the detection accuracy of the object detection model at the object iteration node is determined based on the model parameter(s) corresponding to the previous iteration node of the object iteration node. For example, using the model parameter(s) as the variable of the object detection model at the object iteration node, determining an Intersection over Union (IoU) when the object detection model performs object detection on each of the preset third amount of the training samples, and determining the detection accuracy of the object detection model at the object iteration node based on each of the IoUs.

In which, the above-mentioned variable corresponds to the value of the weight, and the IoU is used to indicate a matchingness between the data frame correctly labeled with the object and a predicted data frame. It will be considered that the predicted data frame correctly matches the data frame labeled with the object only when the loll is larger than a preset ratio such as 0.5. In this embodiment, there is a preset mapping relationship between a probability of the IoU and the detection accuracy, and the determining the detection accuracy of the object detection model at the object iteration node based on each of the IoUs may include: determining the probability that the IoU is larger than the preset ratio as the probability of the loll by calculating the probability that the IoU is larger than the preset ratio according to each of the IoUs, and determine the detection accuracy of the object detection model at the object iteration node based on the mapping relationship between the probability of the IoU and the detection accuracy.

S204: obtaining enhanced negative sample(s) by enhancing mis-detected negative sample(s) of the object detection model at the object iteration node according to a preset negative sample enhancement rule, in response to the detection accuracy being less than or equal to a preset accuracy threshold.

In this embodiment, the preset negative sample enhancement rule is to splice the negative samples that are difficult to learn from the training samples around the positive samples through splicing, for example, splicing the negative samples that are easy to be cropped off during cropping around the positive samples, and then cropping through a preset cropping method to guarantee that the negative samples that are difficult to learn participate in the training of the deep network. After the negative samples that are difficult to learn are spliced and cropped, the obtained sample(s) to participate in the training of the deep network are called enhanced negative sample(s).

Figure 3A:
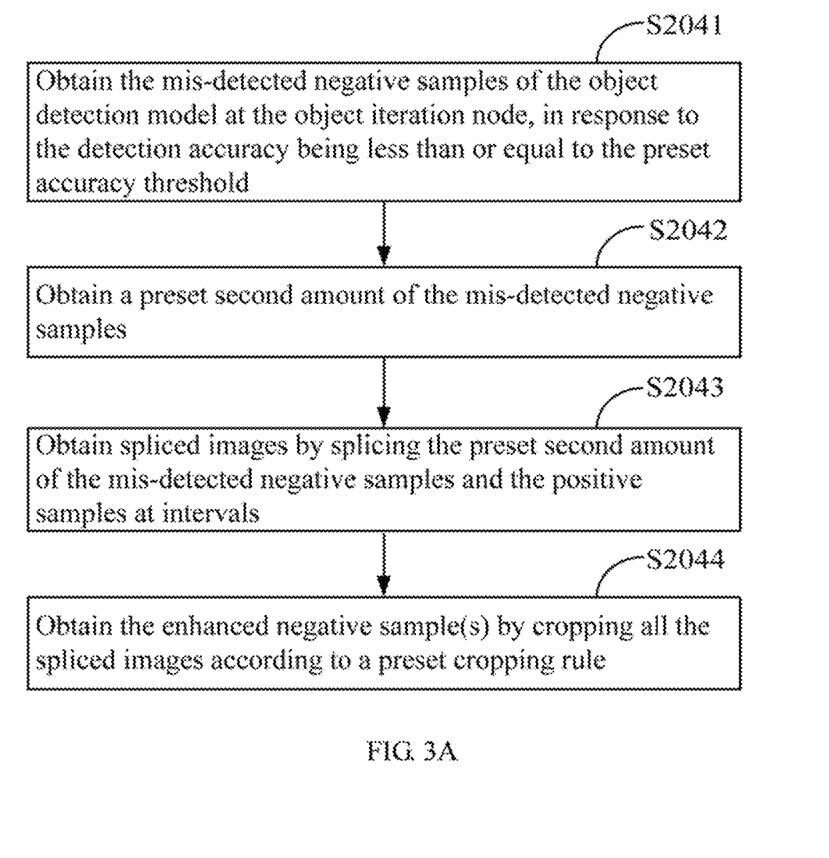
FIG. 3A is a flow chart of an example of step S204 according to the embodiment of the FIG. 2.

FIG. 3A is a flow chart of an example of step S204 according to the embodiment of the FIG. 2. As shown in FIG. 3A, the above-mentioned step S204 may include the following steps.

S2041: obtaining the mis-detected negative samples of the object detection model at the object iteration node, in response to the detection accuracy being less than or equal to the preset accuracy threshold.

In this embodiment, the negative sample of the target mis-detected model that is detected as the positive sample at the previous iteration node is called the mis-detected negative sample. As an example, the obtaining the mis-detected negative samples of the object detection model at the object iteration node may include: determining the negative sample having detected as the positive sample when the object detection model performs object detection on each of the preset first amount of the training samples at the previous iteration node; and obtaining the mis-detected negative samples of the object detection model at the object iteration node by obtaining all the negative samples having detected as the positive sample.

S2042: obtaining a preset second amount of the mis-detected negative samples.

It should be noted that, at the previous iteration node of the object iteration node, the object detection is performed on each of the hatched training samples. Correspondingly, each of the training sample mays have one or more mis-detected negative samples, or some of the training samples may not have mis-detected negative samples. In this embodiment, the preset second amount may be a random number that is less than or equal to the total number of all the mis-detected negative samples such as 2, 3, 4, and the like. Although the preset second amount is not limited, it may be set according to the needs of model training since the larger the preset second amount, the greater the calculation amount during training.

S2043: obtaining spliced images by splicing the preset second amount of the mis-detected negative samples and the positive samples at intervals.

Figure 3B:
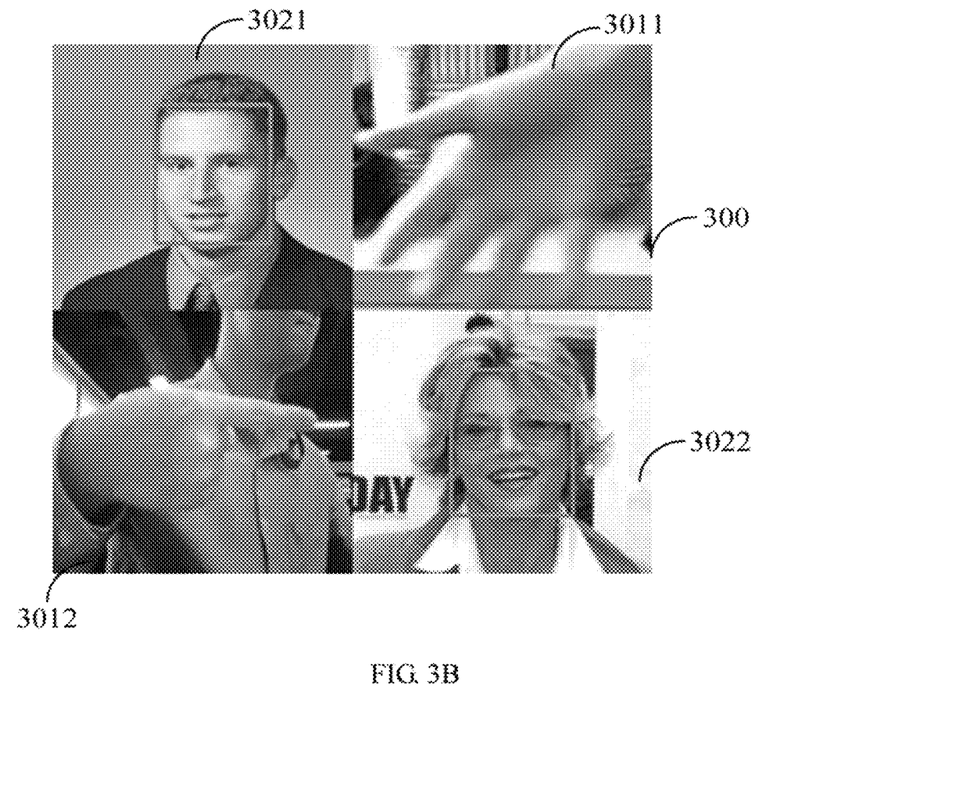
FIG. 3B is a schematic diagram of a 4-square grid image after splicing.

In this embodiment, the spliced image is a grid image, and the mis-detected negative samples and the positive samples are placed in the grids of the grid image at intervals. FIG. 3B is a schematic diagram of a 4-square grid image after splicing. As shown in FIG. 3B, in this embodiment, the two mis-detected negative samples 3011 and 3012 as well as the two positive samples 3021 and 3022 are spliced at intervals to obtain the spliced 4-square grid image 300. That is, from FIG. 3B, the negative samples 3011 and 3012 are placed in each grid of the 4-square grid image 300 at intervals from the positive samples 3021 and 3022.

It should be noted that, in FIG. 3B, the same number (i.e., two) of the mis-detected negative samples 3011 and the positive samples 3021 and 3022 are spliced at intervals to obtain the 4-square grid image 300. In other embodiments, different numbers of the mis-detected negative samples and the positive samples may be spliced at intervals. For example, assuming that the spliced image is a 9-square grid image, it may splice 4 mis-detected negative samples with 5 positive samples at intervals, or splice 5 mis-detected negative samples with 4 positive samples at intervals, where the negative samples may be negative samples of different objects and the positive samples may also be positive samples of different objects.

S2044: obtaining the enhanced negative sample(s) by cropping all the spliced images according to a preset cropping rule.

In this embodiment, each of the grids of the grid image is cropped according to a preset cropping size such as a preset cropping size of the corresponding grids, and the enhanced negative sample is obtained by taking the grid(s) including the mis-detected negative samples as the enhanced negative sample.

S205: training the object iteration node based on the enhanced negative sample(s) and the preset first amount of the training samples.

It should be noted that, the grids image has symmetry, and there are negative samples around each positive sample (e.g., human face). The negative samples are easily ignored during the training of the deep network model, which are inputted into the object detection model for training after the above-mentioned processing, so as to guarantee that the object detection model can leant from the enhanced negative sample, thereby solving the false detection of the object detection model caused by the influence of the negative samples.

S206: returning to the determining the untrained current iteration node as the object iteration node according to the node order after the object iteration node is trained until the object detection model is trained.

It should be noted that, the above-mentioned analysis process is to analyze the process of training the object defection model at the object iteration node in response to the detection accuracy being less than or equal to the preset accuracy threshold. If the detection accuracy is larger than the preset accuracy threshold, it means that the detection accuracy of the object detection model at the object iteration node is not affected by the negative samples. At this time, the object detection model can just be trained at the object iteration node based on the preset first amount of training samples.

It can be seen from the above-mentioned analysis that by adopting the object detection model generation method provided in the present disclosure, during the iterative training of the to-be-trained object detection model, the corresponding detection accuracy of the object detection model at each iteration node that has not finished training is sequentially determined according to the order of the nodes. In addition, for any object iteration node whose detection accuracy is less than or equal to a preset accuracy threshold, the mis-detected negative sample of the object detection model at the object iteration node is enhanced. After the enhanced negative sample is obtained, the object detection model is trained at the object iteration node based on the enhanced negative sample and the preset first amount of the training samples, which can effectively improve the false detection of the object detection model due to the influence of the negative samples.

It should be understood that, the sequence of the serial number of the steps in the above-mentioned embodiments does not mean the execution order while the execution order of each process should be determined by its function and internal logic, which should not be taken as any limitation to the implementation process of the embodiments.

Based on the object detection model generation method provided in the foregoing embodiment, an apparatus for implementing the foregoing method is further provided.

Figure 4:
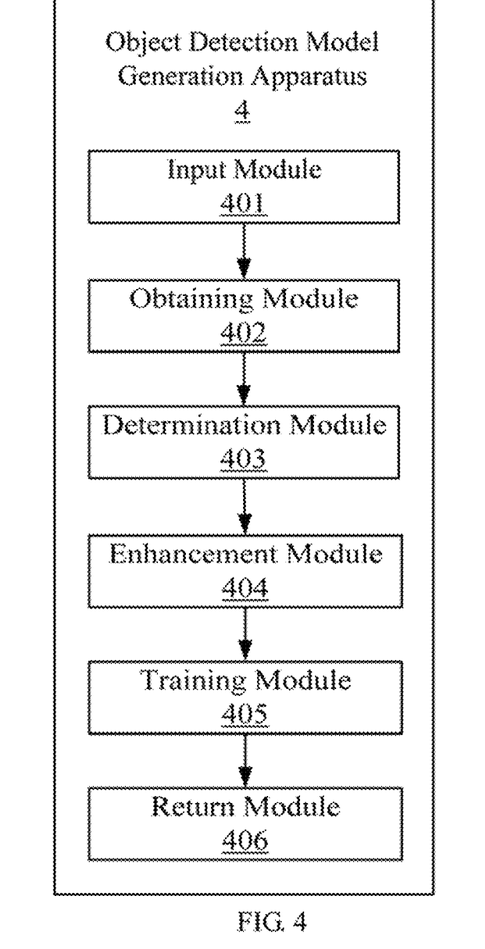
FIG. 4 is a schematic block diagram of an object detection model generation apparatus according to an embodiment of the present disclosure.

FIG. 4 is a schematic block diagram of an object detection model generation apparatus according to an embodiment of the present disclosure. The modules included in the object detection model generation apparatus are configured to execute the steps in the method of the embodiment of FIG. 2. For details, please refer to the relevant description in the embodiment of FIG. 2. For ease of description, only the parts related to this embodiment are shown. As shown in FIG. 4, an object detection model generation apparatus 4 includes:

an input module 401 configured to input a preset first amount of training samples into a to-be-trained object detection model, and perform an iterative training on the object detection model, where the training samples include one or more positive samples and one or more negative samples;

an obtaining module 402 configured to determine an untrained current iteration node as an object iteration node according to a node order, and obtain one or more model parameters of the object detection model corresponding to a previous iteration node of the object iteration node;

a determination module 403 configured to determine a detection accuracy of the object detection model at the object iteration node based on the one or more model parameters;

an enhancement module 404 configured to obtain one or more enhanced negative samples by enhancing one or more mis-detected negative samples of the object detection model at the object iteration node according to a preset negative sample enhancement rule, in response to the detection accuracy being less than or equal to a preset accuracy threshold;

a training module 405 configured to train the object iteration node based on the one or more enhanced negative samples and the preset first amount of the training samples; and a return module 406 configured to return to the determining the untrained current iteration node as the object iteration node according to the node order after the object iteration node is trained until the object detection model is trained.

In one embodiment, the object detection model generation apparatus 4 may further include:

a second training module configured to train the object detection model at the object iteration node based on the preset first amount of the training samples, in response to the detection accuracy being larger than the preset accuracy threshold.

In one embodiment, the enhancement module 404 may include:

a first obtaining unit configured to obtain the one or more mis-detected negative samples of the object detection model at the object iteration node;

a second obtaining unit configured to obtain a preset second amount of the mis-detected negative samples;

a splicing unit configured to obtain one or more spliced images by splicing the preset second amount of the mis-detected negative samples and the positive samples at intervals; and an acquiring unit configured to obtain the one or more enhanced negative samples by cropping all the spliced images according to a preset cropping rule, a first obtaining unit configured to obtain the one or more mis-detected negative samples of the object detection model at the object iteration node;

In one embodiment, the spliced image is a grid image, and the mis-detected negative samples and the one or more positive samples are placed in grids of the grid image at intervals.

In one embodiment, the acquiring unit includes:

a cropping subunit configured to crop the grid image according to a preset cropping size to obtain the grids of the grid image; and an acquiring subunit configured to take the grid including the one or more mis-detected negative samples as the one or more enhanced negative samples.

In one embodiment, the second obtaining unit may include:
- a determination subunit configured to determine the negative sample having detected as the positive sample when the object detection model performs object detection on each of the preset first amount of the training samples at the previous iteration node; and
- an obtaining subunit configured to obtain the one or more mis-detected negative samples of the object detection model at the object iteration node by obtaining all the negative samples having detected as the positive sample.

In one embodiment, the determination module 403 may include:
- a first determination unit configured to take the one or more model parameters as one or more variable of the object detection model at the object iteration node, and determining an Intersection over Union of the object detection model performing object detection on each of a preset third amount of the training samples; and
- a second determination unit configured to determine the detection accuracy of the object detection model at the object iteration node according to each Intersection over Union.

It should be noted that, the information exchange, execution process and the like between the above-mentioned modules are based on the same idea as the method embodiment of present disclosure, for specific functions and technical effects, please refer to the method embodiment for details, which will not be repeated herein.

Figure 5:
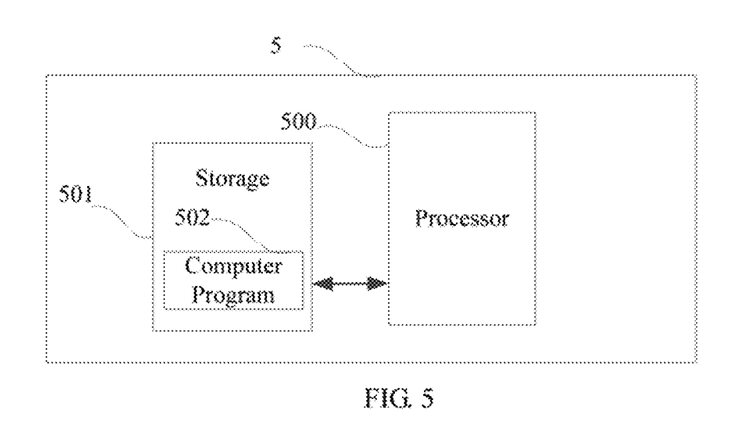
FIG. 5 is a schematic block diagram of an electronic device according to an embodiment of the present disclosure.

FIG. 5 is a schematic block diagram of an object detection electronic device according to an embodiment of the present disclosure. As shown in FIG. 5, in this embodiment, an electronic device 5 includes a processor 500, a storage 501, and a computer program 502 such as an object detection model generation program that is stored in the storage 501 and executable on the processor 500. When the processor 500 executes the computer program 502, the steps such as steps 201-206 shown in FIG. 2 in the foregoing embodiment of the object detection model generation method are implemented. Alternatively, when the processor 500 executes the computer program 502, the functions of the modules/units such as the modules 401-406 in the foregoing device embodiment shown in FIG. 4 may be implemented.

As an example, the computer program 502 may be divided into one or more modules/units, and the one or more modules/units are stored in the storage 501 and executed by the processor 500 to realize the present disclosure. The one or more modules/units may be a series of computer program instruction segments capable of performing specific functions, and the instruction segments are used to describe the execution process of the computer program 502 in the electronic device 5. For example, the computer program 502 can be divided into an input module, an obtaining module, a determination module, an enhancement module, a training module, and a return module. For the specific function of each module, please refer to the relevant description in the corresponding embodiment of FIG. 4, which will not be repeated herein.

The electronic device may include, but is not limited to, a processor 500 and a storage 501. Those skilled in the art should be noted that, the electronic device 5 in FIG. 5 is only an example, and does not constitute a limitation on the electronic device 5. It may include more or less components than those shown in the figure, include a combination of some components, or include different components. For example, the electronic device 5 may also include an input and output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the electronic device 5, for example, a hard disk or a memory of the electronic device 5. The storage 51 may also be an external storage device of the electronic device 5, for example, a plug-in hard disk, a smart media card (SMC), a secure digital (SD) card, flash card, and the like, which is equipped on the electronic device 5. Furthermore, the storage 51 may further include both an internal storage unit and an external storage device, of the electronic device 5. The storage 51 is configured to store the computer program 52 and other programs and data required by the electronic device 5. The storage 51 may also be used to temporarily store data that has been or will be output.

The present disclosure further provides a non-transitory computer readable storage medium storing with computer program(s), and when the computer program is executed by a processor, the above-mentioned object detection model generation method can be implemented.

The present disclosure further provides a computer program product. When the computer program product is executed on an electronic device 5, the electronic device 5 can implement the above-mentioned object detection model generation method.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. An object detection model generation method, comprising steps of:
    inputting a preset first amount of training samples into a to-be-trained object detection model, and performing an iterative training on the object detection model, wherein the training samples include one or more positive samples and one or more negative samples;
    determining, an untrained current iteration node as an object iteration node according to a node order, and obtaining one or more model parameters of the object detection model corresponding to a previous iteration node of the object iteration node;
    determining a detection accuracy of the object detection model at the object iteration node based on the one or more model parameters;
    obtaining one or more enhanced negative samples by enhancing one or more mis-detected negative samples of the object detection model at the object iteration node according to a preset negative sample enhancement rule, in response to the detection accuracy being less than or equal to a preset accuracy threshold;
    training the object iteration node based on the one or more enhanced negative samples and the preset first amount of the training samples; and
    returning to the determining the untrained current iteration node as the object iteration node according, to the node order after the object iteration node is trained until the object detection model is trained;
    wherein the obtaining the one or more enhanced negative samples by enhancing the one or more mis-detected negative samples of the object detection model at the object iteration node according to the preset negative sample enhancement rule comprises:
        obtaining the one or more mis-detected negative samples of the object detection model at the object iteration node;
        obtaining one or more spliced images by splicing a preset second amount of the mis-detected negative samples and the positive samples at intervals; and
        obtaining the one or more enhanced negative samples by cropping all the spliced images according to a preset cropping rule.

2. The method of claim 1, wherein after the determining the detection accuracy of the object detection model at the object iteration node based on the one or more model parameters, further comprises steps of:
    training the object detection model at the object iteration node based on the preset first amount of the training samples, in response to the detection accuracy being larger than the preset accuracy threshold.

3. The method of claim 1, wherein the spliced image is a grid image, and the mis-detected negative samples and the one or more positive samples are placed in grids of the grid image at intervals.

4. The method of claim 3, wherein the obtaining the one or more enhanced negative samples by cropping all the spliced images according to the preset cropping rule comprises:
    cropping the grid image according to a preset cropping size to obtain the grids of the grid image; and
    taking the grid including the one or more mis-detected negative samples as the one or more enhanced negative samples.

5. The method of claim 1, wherein the obtaining the one or more mis-detected negative samples of the object detection model at the object iteration node comprises:
    determining the negative sample having detected as the positive sample when the object detection model performs object detection on each of the preset first amount of the training samples at the previous iteration node; and
    obtaining the one or more mis-detected negative samples of the object detection model at the object iteration node by obtaining all the negative samples having detected as the positive sample.

6. The method of claim 1, wherein the determining the detection accuracy of the object detection model at the object iteration node based on the one or more model parameters comprises:
    taking the one or more model parameters as one or more variable of the object detection model at the object iteration node, and determining an Intersection over Union of the object detection model performing object detection on each of a preset third amount of the training samples; and
    determining the detection accuracy of the object detection model at the object iteration node according to each Intersection over Union.

7. An electronic device, comprising:
    a processor;
    a memory coupled to the processor; and
    one or more computer programs stored in the memory and executable on the processor,
    wherein, the one or more computer programs comprise:
    instructions for inputting a preset first amount of training samples into a to-be-trained object detection model, and performing an iterative training on the object detection model, wherein the training samples include one or more positive samples and one or more negative samples;
    instructions for determining an untrained current iteration node as an object iteration node according to a node order, and obtaining one or more model parameters of the object detection model corresponding to a previous iteration node of the object iteration node;
    instructions for determining a detection accuracy of the object detection model at the object iteration node based on the one or more model parameters;
    instructions for obtaining one or more enhanced negative samples by enhancing one or more mis-detected negative samples of the object detection model at the object iteration node according to a preset negative sample enhancement rule, in response to the detection accuracy being less than or equal to a preset accuracy threshold;

instructions for training the object iteration node based on the one or more enhanced negative samples and the preset first amount of the training samples; and instructions for returning to the determining the untrained current iteration node as the object iteration node according to the node order after the object iteration node is trained until the object detection model is trained;

wherein the instructions for obtaining the one or more enhanced negative samples by enhancing the one or more mis-detected negative samples of the object detection model at the object iteration node according to the preset negative sample enhancement rule comprise:

instructions for obtaining the one or more mis-detected negative samples of the object detection model at the object iteration node;

instructions for obtaining one or more spliced images by splicing a preset second amount of the mis-detected negative samples and the positive samples at intervals; and instructions for obtaining the one or more enhanced negative samples by cropping all the spliced images according to a preset cropping rule.

8. The electronic device of claim 7, wherein the one or more computer programs further comprise:

instructions for training the object detection model at the object iteration node based on the preset first amount of the training samples, in response to the detection accuracy being larger than the preset accuracy threshold.

9. The electronic device of claim 7, wherein the spliced image is a grid image, and the mis-detected negative samples and the one or more positive samples are placed in grids of the grid image at intervals.

10. The electronic device of claim 9, wherein the instructions for obtaining the one or more enhanced negative samples by cropping all the spliced images according to the preset cropping rule comprise:

instructions for cropping the grid image according to a preset cropping size to obtain the grids of the grid image; and instructions for taking the grid including the one or more mis-detected negative samples as the one or more enhanced negative samples.

11. The electronic device of claim 7, wherein the instructions for obtaining the one or more mis-detected negative samples of the object detection model at the object iteration node comprise:

instructions for determining the negative sample having detected as the positive sample when the object detection model performs object detection tan each of the preset first amount of the training samples at the previous iteration node; and instructions for obtaining the one or more mis-detected negative samples of the object detection model at the object iteration node by obtaining all the negative samples having detected as the positive sample.

12. The electronic device of claim 7, Wherein the instructions for determining, the detection accuracy of the object detection model at the object iteration node based on the one or more model parameters comprise:

instructions for taking the one or more model parameters as one or more variable of the object detection model at the object iteration node, and determining an Intersection over Union of the object detection model performing object detection on each of a preset third amount of the training samples; and instructions for determining the detection accuracy of the object detection model at the object iteration node according to each Intersection over Union.

13. A non-transitory computer readable storage medium for storing one or more computer programs, wherein the one or more computer programs comprise:

instructions for inputting a preset first amount of training samples into a to-be-trained object detection model, and performing an iterative training on the object detection model, wherein the training samples include one or more positive samples and one or more negative samples;

instructions for determining an untrained current iteration node as an object iteration node according to a node order, and obtaining one or more model parameters of the object detection model corresponding to a previous iteration node of the object iteration node;

instructions for determining a detection accuracy of the object detection model at the object iteration node based on the one or more model parameters;

instructions for obtaining one or more enhanced negative samples by enhancing one or more mis-detected negative samples of the object detection model at the object iteration node according to a preset negative sample enhancement rule, in response to the detection accuracy being less than or equal to a preset accuracy threshold;

instructions for training the object iteration node based on the one or more enhanced negative samples and the preset first amount of the training samples; and instructions for returning to the determining the untrained current iteration node as the object iteration node according to the node order after the object iteration node is trained until the object detection model is trained;

wherein the instructions for obtaining the one or more enhanced negative samples by enhancing the one or more mis-detected negative samples of the object detection model at the object iteration node according to the preset negative sample enhancement rule comprise:

instructions for obtaining the one or more mis-detected negative samples of the object detection model at the object iteration node;

instructions for obtaining one or more spliced images by splicing a preset second amount of the mis-detected negative samples and the positive samples at intervals; and instructions for obtaining the one or more enhanced negative samples by cropping all the spliced images according to a preset cropping rule.

14. The storage medium of claim 13, wherein the one or more computer programs further comprise:

instructions for training the object detection model at the object iteration node based on the preset first amount of the training samples, in response to the detection accuracy being larger than the preset accuracy threshold.

15. The storage medium of claim 13, wherein the spliced image is a grid image, and the mis-detected negative samples and the one or more positive samples are placed in grids of the grid image at intervals.

16. The storage medium of claim 15, wherein the instructions for obtaining the one or more enhanced negative samples by cropping all the spliced images according to the preset cropping rule comprise:

instructions for cropping the grid image according to a preset cropping size to obtain the grids of the grid image; and instructions for taking the grid including the one or more mis-detected negative samples as the one or more enhanced negative samples.

17. The storage medium of claim 13, wherein the instructions for obtaining the one or more mis-detected negative samples of the object detection model at the object iteration node comprise:
   instructions for determining the negative sample having detected as the positive sample when the object detection model performs object detection on each of the preset first amount of the training samples at the previous iteration node; and
   instructions for obtaining the one or more mis-detected negative samples of the object detection model at the object iteration node by obtaining all the negative samples having detected as the positive sample.

18. The storage medium of claim 13, wherein the instructions for determining the detection accuracy of the object detection model at the object iteration node based on the one or more model parameters comprise:
   instructions for taking the one or more model parameters as one or more variable of the object detection model at the object iteration node, and determining an Intersection over Union of the object detection model performing object detection on each of a preset third amount of the training samples; and
   instructions for determining the detection accuracy of the object detection model at the object iteration node according to each Intersection over Union.

19. The storage medium of claim 13, wherein positive sample is a target area marked in an training image, and the negative sample is an area around the positive sample in the training image.

20. The storage medium of claim 13, wherein a structure of the object detection model is a convolutional neural network, a deep trust network, or a stacked self-encoding network.

* * * * *